Aug. 7, 1956

H. GRAYSON 2,758,208

ELECTRIC FREQUENCY DIVIDERS

Filed Dec. 17, 1953

Inventor
H. GRAYSON
By Philip M. Bolton
Attorney

United States Patent Office 2,758,208

Patented Aug. 7, 1956

2,758,208

ELECTRIC FREQUENCY DIVIDERS

Harry Grayson, London, England, assignor to International Standard Electric Corporation, New York, N. Y., a corporation of Delaware Application December 17, 1953, Serial No. 398,806

Claims priority, application Great Britain December 23, 1952

3 Claims. (Cl. 250—36)

The present invention relates to electric frequency dividers.

Circuits employing amplifiers and arranged to have two stable or temporarily stable conditions are well-known, and are frequently used in electric counting circuits.

The present invention relates to arrangements of this kind adapted for frequency division, so that in response to the application of an input sinewave of frequency F, an output sinewave of frequency F/$n$ can be obtained, where $n$ is an integer greater than 1.

The invention provides an electric frequency divider circuit comprising an amplifying device arranged to produce in response to an input wave having a given frequency, an output wave having a frequency equal to an integral submultiple of the given frequency, the amplifying device being blocked in the absence of the input wave, a gating circuit associated with the input circuit of the amplifying device, and means for applying both the input and output waves to control the gating circuit in such manner that the amplifying device is periodically unblocked for short periods repeated at the submultiple frequency, whereby the output wave is generated.

The invention will be described with reference to the accompanying drawing in which.

Figure 1:
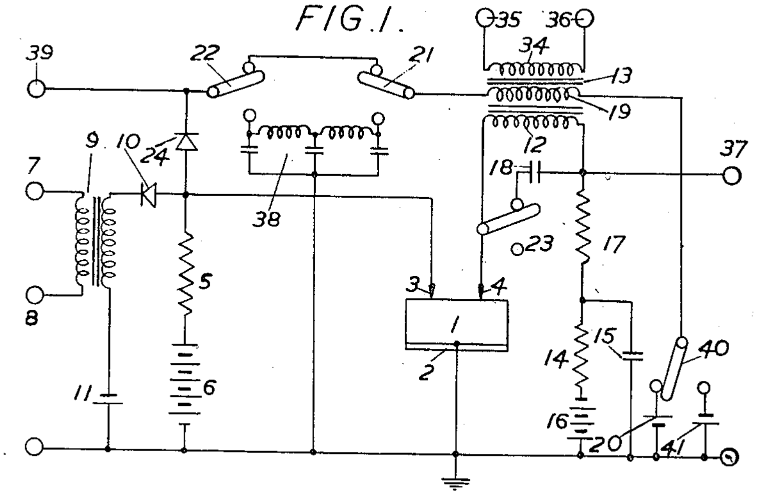
Fig. 1 shows a schematic circuit diagram of an embodiment of the invention.

In the circuit of Fig. 1, a semi-conducting amplifying device known as a crystal triode is used. The crystal triode comprises a crystal 1 of a suitable semi-conductor, such as germanium, having a base electrode 2 making low resistance contact with the crystal, and having input and output electrodes 3 and 4, called respectively the emitter and collector electrodes, which also make contact with the crystal. It will be assumed for clearness that the crystal triode is of the kind in which, in order to operate as an amplifier, the emitter and collector electrodes 3 and 4 are polarised respectively positively and negatively with respect to the base electrode 2.

The base electrode 2 of the crystal triode is connected directly to ground, and the emitter electrode 3 is connected through a relatively large feed resistor 5 to a positive polarising source 6 which may, for example, have a potential of 80 volts. The input wave of frequency F is supplied from terminals 7, 8 through an input transformer 9, the secondary winding of which has one terminal connected to the emitter electrode 3 through a rectifier 10, and the other terminal to an auxiliary negative bias source 11, having a potential of perhaps one or two volts. The rectifier 10 should be directed so that it is just unblocked in this condition, whereby in the absence of any input wave, the emitter electrode 3 will be polarised slightly negatively so that the emitter current is cut off.

The collector electrode 4 is connected to ground through the primary winding 12 of an output transformer 13 and through a decoupling resistor 14, provided with the usual grounded decoupling capacitor 15, and a negative polarising source 16 having a potential of, for example, 45 volts. A load resistor 17 may be included in series between the primary winding 12 and the decoupling resistor 14.

The decoupling elements 14 and 15 are not essential and they could be omitted; for example when the source 16 does not supply any other circuit, as will be understood by those skilled in the art.

A capacitor 18 is connected across the primary winding of the output-transformer 13 through the contacts of a two-position switch 23, when in the upper position, as shown. The capacitor 18 is of such magnitude as to tune the winding 12 to a frequency F/2. A first secondary winding 19 of the transformer 13 has one terminal connected to a grounded positive source 20, having a potential of perhaps one or two volts through the contacts of a two-position switch 40, when in the left-hand position, as shown. The other terminal of the winding 19 is connected to the emitter electrode 3 through a rectifier 24, and through two two-position switches 21, 22, when in the upper position, as shown. The rectifier 24 should be directed so that it is blocked in this condition when there are no input waves. Thus, as already stated, when there are no input waves, the rectifier 10 is unblocked and the emitter electrode 3 has a small negative potential whereby the emitter current is cut off, and the crystal triode is thus blocked and cannot amplify.

The operation of the circuit will be explained with reference to Fig. 2, in which all curves represent voltages with respect to the same time scale. The zero axis represents ground potential in all cases. Curve A shows the voltage variation at the left-hand terminal of the rectifier 10, when a sine wave of frequency F is applied at the input terminals 7, 8. Curve B represents the potential variation of the upper terminal of the resistor 17; curve C shows the potential variation of the emitter electrode 3; and curve D shows the potential variation at the left-hand terminal of the winding 19.

When the input waves of frequency F are applied through the input transformer 9, the first positive half wave 25 (Fig. 2) will overcome the small auxiliary negative potential provided by the source 11 and will block the rectifier 10, whereby the emitter electrode 3 now assumes a positive potential obtained from the source 6, which potential is reduced to a small value by the potential drop in the feed resistor 5, through which the emitter current now flows, and the crystal triode is thereby unblocked. The collector current therefore suddenly increases and shock-excites the parallel resonant circuit consisting of the primary winding 12 of the output transformer 13 and shunt capacitor 18, which, as already stated, is tuned to the half-frequency F/2. The secondary winding 19 of the output transformer 13 should be poled so that the first half-wave 26 (Fig. 2) applied to the rectifier 24 from the output transformer 13 is positive so that it maintains the rectifier 24 blocked. On the occurrence of the second (negative) input half-cycle 27 (Fig. 2) of frequency F, the rectifier 10 will be again unblocked and the crystal triode will accordingly be blocked again. A pulse 28 (Fig. 2) is thus generated at the upper end of the resistor 17. The pulse 28 has a duration less than half a cycle of the input wave, because the bias source 11 effectively depresses the input wave with respect to the zero axis as clearly shown in curve A (Fig. 2).

When the third (positive) half-cycle 29 (Fig. 2) of the input wave occurs, the rectifier 10 will be blocked again as before, but the second half-cycle 30 (Fig. 2) of the output wave of frequency F/2 is now negative and unblocks the rectifier 24, thereby applying negative potential to the emitter electrode 3 and holding the crystal triode blocked. The crystal triode can however be unblocked by the fifth (positive) half-cycle 31 (Fig. 2) of the input wave because it synchronizes with the third half-cycle 32 of the output wave which will be positive. A second pulse 33 is thus generated at the upper end of resistor 17 so re-exciting the resonant circuit 12, 18. The operation is thus maintained, only alternate positive half-cycles of the input wave being effective to excite the resonant circuit. The output waves have therefore half the frequency of the input waves and may be obtained, for example, from an additional secondary winding 34 on the output transformer, which is shown connected to two output terminals 35, 36.

Alternatively, the pulses like 28, 33, Fig. 3, generated by the collector electrode 4 (which have half the repetition frequency of the input wave) could be obtained, if desired, as the voltage variations across the load resistor 17, from an output terminal 37.

Figure 2:
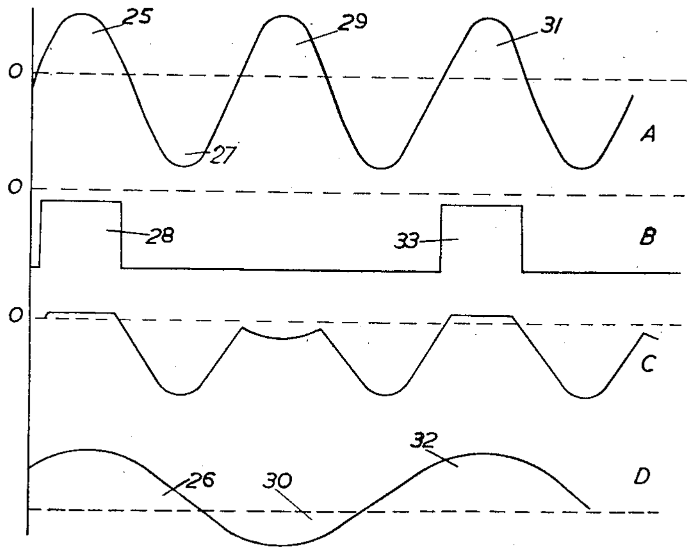
Fig. 2 shows waveform diagrams used in the explanation of the embodiment.

It will be seen from curve C of Fig. 2 that the potential of the emitter electrode 3 is slightly positive only during the periods of the alternate positive half-cycles 25 and 31 of the input waves of frequency F. At all other times it is negative, and the crystal triode is blocked.

It should be added that division by integers greater than 2 can also be obtained by tuning the resonant circuit 12, 18 to other submultiples of the frequency of the input wave, but for submultiples of higher order than about 4 it becomes rather difficult to arrange the circuit to operate reliably and a slightly different arrangement is preferable. This arrangement is obtained by operating the switches 21, 22 and 23 to the lower position (that is, to the position opposite to that shown in Fig. 1 in each case). This disconnects the capacitor 18, and the pulses such as 28, 33 (Fig. 2) generated by the collector electrode 4 are now applied to the rectifier 24 through a delay network 38 of conventional type. The delay should be one, or other whole number of periods of the submultiple frequency, so that the crystal triode can only be unblocked by the rectifier 24 during the positive cycle of every *n*th period of the input waves.

In the arrangement shown in Fig. 1, the auxiliary source 20 may be replaced by a similar source 41 of opposite polarity, by operating the switch 40 to the position opposite to that shown in Fig. 1. The rectifier 24 is now initially unblocked, and the input wave applied at terminals 7, 8 will be unable to unblock the crystal triode, and thus will be unable to start the operation of the circuit. This arrangement permits the starting of the operation at any desired moment by the application of a positive starting pulse to a triggering terminal 39 connected to the upper terminal of the rectifier 24 of sufficient amplitude to overcome the negative potential of the source 20, thus blocking the rectifier 24 and enabling the input wave to start the operation. Once the operation is started, the first positive half-cycle 26 (Fig. 2) of the output wave of half frequency can hold the rectifier 24 blocked and the operation then continues as described. The operation could be stopped again by the application to terminal 39 of a negative pulse of sufficient amplitude to prevent the output wave from holding the rectifier 24 blocked.

The arrangement including the rectifiers 10 and 24 can be regarded as a normally shut gating circuit through which the positive potential from the source 6 is applied to the emitter electrode as an unblocking potential. It cannot reach the emitter electrode unless both rectifiers 10 and 24 are simultaneously blocked, and the input and output waves respectively control these rectifiers. The rectifier 10 is unblocked by every positive half-cycle of the input wave, and the output wave can be regarded as acting on the rectifier 24 to prevent the opening of the gate except when a positive half-cycle of the input wave occurs and when the potential applied to rectifier 24 by the output wave is also positive. In the case when the dividing ratio is large and the delay network 38 is used, the gate is prevented from opening during the whole period between two such pulses as 28 and 33 shown in Fig. 2, curve B.

It will be understood that it is not essential to provide the switches 21, 22, and 23, which have only been shown to make clear the various possible forms of the circuit. Thus, the elements 18 and 38 will not be used together, and one of them may therefore be omitted, and the other connected permanently in the circuit. Similarly, switch 40 can be omitted if it is not desired to provide both the sources 20 and 41.

Attention is drawn to the fact that the crystal triode employed in the circuit need not have a current gain so long as it has a power gain, because the winding ratio of the output transformer 13 can be chosen so that the output wave applied to block and unblock the rectifier 24 has suitable amplitude. Most of the previously known counting or trigger circuits employing crystal triodes require that the crystal triode have appreciable current gain.

One of the advantages of the arrangement described is that the adjustments are not very critical and the crystal triode does not need to have very closely specified characteristics. The arrangement is not very sensitive to variations in the power supply sources.

Although it has been assumed for clearness that the crystal triode used is of the kind requiring for operation as an amplifier a positive potential for the emitter electrode and a negative potential for the collector electrode, the opposite kind of crystal triode could also be used, in which case the polarities of all the sources, and the connections of the rectifiers, should be reversed.

The crystal triode used in the circuit of the invention can be of the type in which the emitter and collector electrodes consist of sharply-pointed wires or catswhiskers, or in which the semi-conducting crystal has several regions having respectively P- and N-type condition characteristics, with what are called P-N junctions between alternate regions, all the electrodes consisting of metal coatings or the like arranged in contact with different regions of the crystal.

It should be noted also that with slight modifications to the circuit the crystal triode could be replaced by an ordinary thermionic valve, for example.

While the principles of the invention have been described above in connection with specific embodiments, and particular modifications thereof, it is to be clearly understood that this description is made only by way of example and not as a limitation on the scope of the invention.

What I claim is:

1. An electric frequency divider circuit comprising an amplifier, a gating circuit coupled to the input of said amplifier and normally blocking said amplifier, means for applying an input wave of a given frequency to control said gating circuit, circuit means for deriving from the output of said amplifier an output wave and for applying the said output wave at a periodicity equal to a sub-multiple of said given frequency to control said gating circuit, said circuit means comprising a resonant circuit tuned to the said sub-multiple frequency and means in said gating circuit responsive to the joint control of said input wave and said output wave to unblock said amplifier at said sub-multiple frequency.

2. An electric frequency divider circuit comprising a crystal triode having an emitter electrode, a collector electrode and a base electrode, a first polarizing source having one terminal connected to the base electrode and the other terminal connected through a feed resistor to the emitter electrode, and being arranged for polarizing the emitter contact in the low resistance direction, the emitter electrode being also connected to the base electrode through separate input and output bias circuits, each including a rectifier and a bias source, the bias source and rectifier in the input bias circuit being poled in such manner as to block the emitter contact, the two rectifiers having like terminals connected to the emitter electrode, a second polarizing source having one terminal connected to the base electrode and the other to the collector electrode in such manner as to polarize the collector contact in the high resistance direction, an input transformer having its secondary winding connected in series with the input bias circuit, an output transformer having its primary winding connected in series with the collector polarizing source and a secondary winding connected in series with the output bias circuit, means for supplying an input wave having a given frequency to the primary winding of the input transformer, means for tuning the output transformer to a frequency equal to an integral sub-multiple of the given frequency, and means for deriving an output wave of sub-multiple frequency from the crystal triode.

3. An electric frequency divider circuit comprising a crystal triode having an emitter electrode, a collector electrode and a base electrode, a first polarizing source having one terminal connected to the base electrode and the other terminal connected through a feed resistor to the emitter electrode, and being arranged for polarizing the emitter contact in the low resistance direction, the emitter electrode being also connected to the base electrode through separate input and output bias circuits, each including a rectifier and a bias source, the bias source and rectifier in the input bias circuit being poled in such manner as to block the emitter contact, the two rectifiers having like terminals connected to the emitter electrode, a second polarizing source having one terminal connected to the base electrode and the other to the collector electrode in such manner as to polarize the collector contact in the high resistance direction, an input transformer having its secondary winding connected in series with the input bias circuit, an output transformer having its primary winding connected in series with the collector polarizing source and a secondary winding connected to the rectifier in the output bias circuit through a delay network, means for supplying an input wave having a given frequency to the primary winding of the input transformer, and means for deriving an output wave of sub-multiple frequency from the crystal triode, the said delay network having a delay equal to $n$ periods of said sub-multiple frequency, where $n$ is an integer including one.

References Cited in the file of this patent

UNITED STATES PATENTS

| | | |
|---|---|---|
| 2,445,933 | Beste | July 27, 1948 |
| 2,538,278 | Brown et al. | Jan. 16, 1951 |
| 2,595,208 | Bangert | Apr. 29, 1952 |
| 2,660,668 | Williams | Nov. 24, 1953 |